United States Patent [19]

Nicholls

[11] Patent Number: 5,551,372

[45] Date of Patent: Sep. 3, 1996

[54] MODULAR CAGE SYSTEM

[76] Inventor: Anthea V. Nicholls, Cherry Tree Road, Pomonal Vic 3381, Australia

[21] Appl. No.: 323,452

[22] Filed: Oct. 14, 1994

[30] Foreign Application Priority Data

Oct. 15, 1993 [AU] Australia ............................... PM 1816

[51] Int. Cl.$^6$ ................................................ A01K 31/08
[52] U.S. Cl. ............................ 119/474; 119/452; 119/455
[58] Field of Search ............................... 119/15, 17, 19, 119/20

[56] References Cited

U.S. PATENT DOCUMENTS

| | | | |
|---|---|---|---|
| 1,462,107 | 7/1923 | Holman | 119/17 X |
| 2,965,259 | 12/1960 | Johnson | 119/19 |
| 3,058,445 | 10/1962 | Johnson | 119/17 |
| 3,398,719 | 8/1968 | Walker | 119/17 |
| 3,721,213 | 3/1973 | Bruggeman | 119/17 |
| 5,010,848 | 4/1991 | Rankin | 119/17 X |

*Primary Examiner*—Gene Mancene
*Assistant Examiner*—Thomas Price
*Attorney, Agent, or Firm*—Davis, Bujold & Streck, P.A.

[57] ABSTRACT

A modular cage system (10) for a terrestrial animal or a bird which comprises at least two enclosures (11, 13) each enclosure being joined to another enclosure by a tunnel or walkway (12) and an entrance/exit (14) from and to sleeping quarters, wherein each enclosure is sufficiently large to allow the animal or bird to move in a relatively unobstructed fashion and wherein each tunnel or walkway is adapted to provide unobstructed passage from one enclosure to another and to provide the illusion of travel over an extended distance and a diminished sense of being caged.

15 Claims, 5 Drawing Sheets

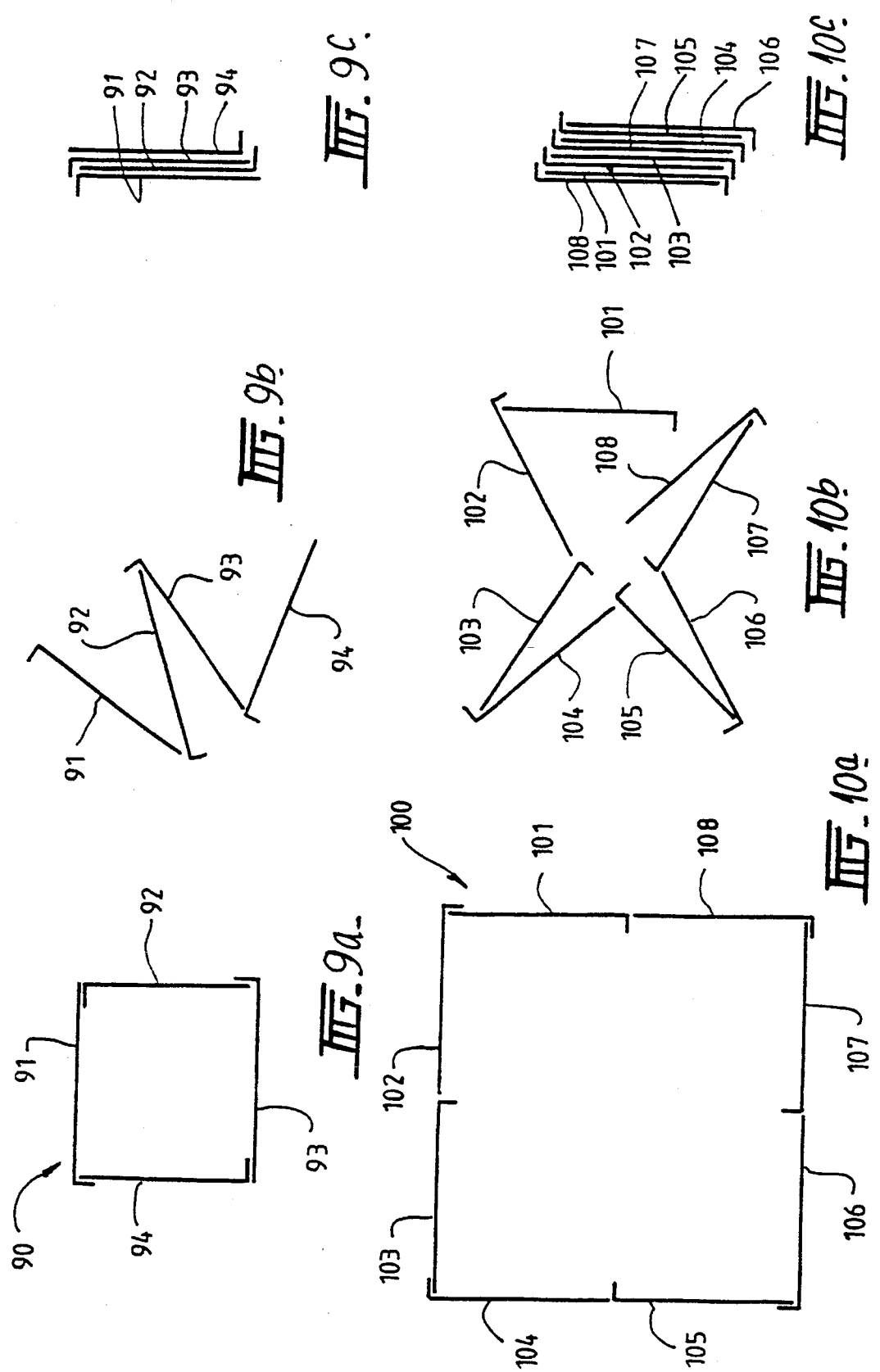

MODULAR CAGE SYSTEM

FIELD OF THE INVENTION

This invention relates to cage system for animals. It is particularly applicable to modular cage systems for domestic cats constructed from wire mesh or netting. It will however be understood that the invention is applicable to other forms of material and for birds or animals other than domestic cats.

BACKGROUND OF THE INVENTION

Recently it has been claimed that there is a problem with cats harming natural fauna. Bother feral and domestic cats have been known to hunt and kill small animals and native birds. Whereas attempts have been made by the authorities to control this problem by capturing or exterminating cats found in national parks and wildlife bush areas, this is expensive and not always effective. Domestic cats may elude their captors and return to the safety of the home of their owners.

Other strategies to reduce the harm done by cats put forward by environmental enthusiasts, are to ban the ownership of cats in certain areas, or allow only restrained or caged animals. The domestic cat lobby however, tend to object to this. They believe it is their right to own a cat and to not have to contain it. It is their view that a cage is too restrictive for their pet and cruel.

There are then two lobbies and a difficulty in reaching a compromise between them. In the meantime, much debate continues and authorities struggle with the problem of imposing what are seen as draconian laws regarding the banning or caging of pets.

In order to overcome these problems, it has been proposed to provide an invention which restrains a pet or other animal, but which allows it certain freedom to move about. The invention is a modular cage system.

BRIEF SUMMARY OF THE INVENTION

This invention, therefore, provides a modular cage system for a terrestrial animal or a bird which comprises at least two enclosures each enclosure being joined to another enclosure by a tunnel or walkway and an entrance/exit means from and to sleeping quarters, wherein each enclosure is sufficiently large to allow the animal or bird to move in a relatively unobstructed fashion and wherein each tunnel or walkway is adapted to provide unobstructed passage from one enclosure to another and to provide the illusion of travel over an extended distance and a diminished sense of being caged.

BRIEF DESCRIPTION OF THE DRAWINGS

The accompanying drawings illustrate one embodiment of the invention and a number of construction approaches. Thus:

FIG. 8b is a detail of one corner of the boxlike construction of FIG. 8a;

FIGS. 9a, 9b and 9c illustrate the collapsing of a small module or tunnel to form a carry pack of panels; and FIGS. 10a, 10b and 10c are similar to FIGS. 9a, 9b and 9c but as applied to a larger module or tunnel.

DETAILED DESCRIPTION OF THE INVENTION

Figure 1:
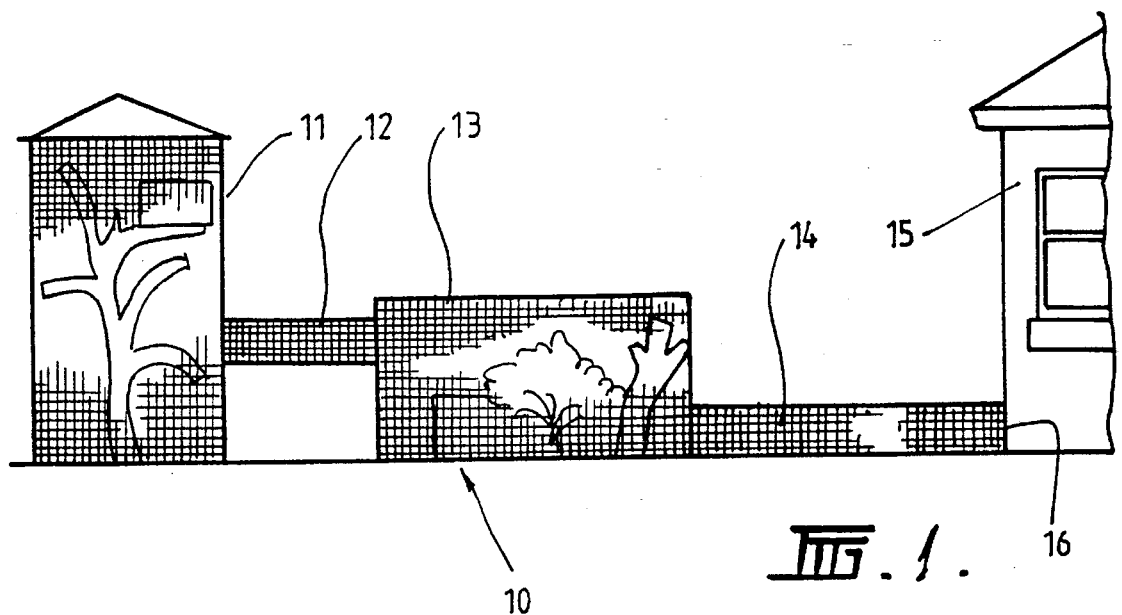
FIG. 1 is a longitudinal, side view of a modular cage system according to the invention.

The advantage of the invention over current cage systems, is that the network of modules provides natural entertainment for the animal. It diminishes or removes the sense of being caged, because the occupant can leave each module whenever it likes. In the case of a cat, the system exploits its "personality" to stimulate a healthy response from the cat. In other words, the modules exploit its curiosity and ensure that the cat exercises and plays. Other advantages of the invention are that the system is economical to produce and easy to erect. A person's chosen design can also be altered or added to when desired.

Preferably each enclosure, tunnel or walkway comprises a plurality of structural elements adapted to be secured together to form a cage system.

Preferably each element of the system is demountable from each other element or elements.

Preferably each element of the system is collapsible for portability and storage.

Preferably at least some of the elements are folded for the purpose of strength or ease of securing.

Preferably at least some of the elements are foldable for ease of storage.

Preferably elements are joined one to another by joiner means which are adapted to allow a degree of relative movement between adjacent elements.

Preferably at least one tunnel or walkway and its associated enclosure or enclosures are adapted so that the tunnel or walkway may be suspended at a selected distance or distance above the ground.

In a preferred embodiment of the invention, the system is designed as a fully modular system for cats. It is fabricated mainly from 2 mm wire mesh panels, formed by longitudinal and lateral elongate rigid mesh members with a square pattern, 50 mm×50 mm. The mesh panels continuous and 900 mm wide. Different style and sized cages, tunnels and walkways are sold separately as modules. Each module is designed to form "flat-packs" for easy transportation.

In one preferred form of the invention, rectangular cages are provided in several sizes, based on multiples of 900 mm mesh width. A single side panel is made by folding over the last row of mesh squares at 90 degrees. This adds rigidity to the panel and provides a support structure for joining the next part. The resultant width of each panel is then approximately 850 mm and cages may be made from multiple panels. For instance, one cage (module) may be 1700×850×850 mm.

Modules may be rectangular, square, triangular or cylindrical to name a few. In designing the layout of a particular site, the flexibility possible by offering such modules is important. Where there are trees or obstacles a cage system can be built over or around objects. A large rectangular or cylindrical cage, for instance, may be placed over a tree. This would not only provide a good playground for the cat, but also make the tree and cage into a feature.

In a preferred form of the invention, the individual modules are interconnected by either tunnels or walkways. Tunnels or walkways may be either square (or rectangular) in cross section or rounded.

In the case of generally square section tunnels, the construction may be only three sided. The underside of the tunnel may be omitted and the construction placed directly on the ground. The mesh side in contact with the ground may be trimmed so that the vertical cross pieces can be struck into the ground to hold the unit in place. Alternatively, any tunnel or module may be secured to the ground by pegs not dissimilar to tent pegs. Such tunnels allow a cat to run directly along the ground, restrained by the mesh. Tunnels built in this fashion may be moved as desired, for variety for the animal, or to mow grass. Tunnels may interconnect two modules, or connect between a module and some other structure, for instance a house.

Walkways may also interconnect modules or a module to a building. Walkways need not be placed against the ground, but may instead be off the ground. In this way, joining of modules to modules, or modules to buildings, is permitted allowing human passage underneath, or reaching across some obstacle. In the preferred embodiment, an alternative way to construct a walkway, is by a semi-circular mesh part (in cross section), with the open ends of the mesh joined to a plank or wood or similar. Where a walkway is not on ground level, this provides support for the structure and a smooth walkway for the cat to run along.

In the preferred embodiment, joining of one mesh panel to an adjacent mesh panel is achieved in several ways. A spring joiner may be utilised. The spring is wound around abutting elongate mesh member thus holding them securely together. This form of joining is also useful where a hingeable mesh door is required. Several springs in line form a reliable and robust hinge. Other mesh joining means may be provided by netting fasheners as is known in the art.

Where modules are built with a side or section that is hingeable (to form an access door), a door catch may be necessary. This may be achieved by a hand twisted wire part, a commercially available hinge or a special hinge constructed from wire. The latter hinge could be made in the form of an S shape or an L-shape; see FIG. 5.

One end of this would be permanently wound around one elongate mesh member. The other would be selectively attachable to the other mesh part, by hooking it over a perpendicular mesh part. The inherent "spring" of the L shaped panel would hold the two elongate mesh member panels together unless released by a strong force such as a human hand.

In one preferred embodiment there is provided optional attachment to connect tunnels or walkways to houses or other sleeping quarters via door system. One alternative is for the walkway/tunnel to run beneath the house. The end of the tunnel forms a chute, or directly connects to the floor of the house. There is provided a hingeable part of the floor, in the manner of a trap door. This may be locked by the residents as desired. When the door is open, the cat may leave the human house as desired, and move about the modular cage system. Another door system is where the tunnel/walkway terminates beside a wall of the house, or a door. In this case, a vertical "cat door" may be provided in any of the variations known in the art.

In a preferred embodiment the modules are pre-fabricated in flat-pack style for easy transportation. The user simply follows a plan and assembles the various parts. Alternatively, the sides of modules are joined at all but one corner. The sides hinge flat for delivery/storage and are more easily assembled by the person erecting the structure. An added advantage of modules that can be made flat-pack, is when an owner of the device wishes to move his residence to a new house. The modules could be folded up and easily conveyed to the new residence for re-erection.

In other embodiments of the invention, 50 mm mesh is not used. Instead mesh or netting of another diameter is utilised. The choice of mesh or netting would depend on availability or product and the type of animal that one wishes to cage. In any embodiment of the invention the mesh or netting may be of any material known in the art. Wire, which is coated, plated or painted may be utilised. Mesh or netting made from polymers or composites may also be utilised in the invention. Flat panels made from solid material may also be utilised without diverging from the intent of the invention.

Turning to the accompanying drawings, in FIG. 1 a modular cage system 10 comprises a tower enclosure 11 connected via an elevated walkway 12 to a low enclosure 13. This low enclosure connects to a ground-level walkway 14 which in turn connects to a house 15 through an underfloor entrance 16.

Figure 2:
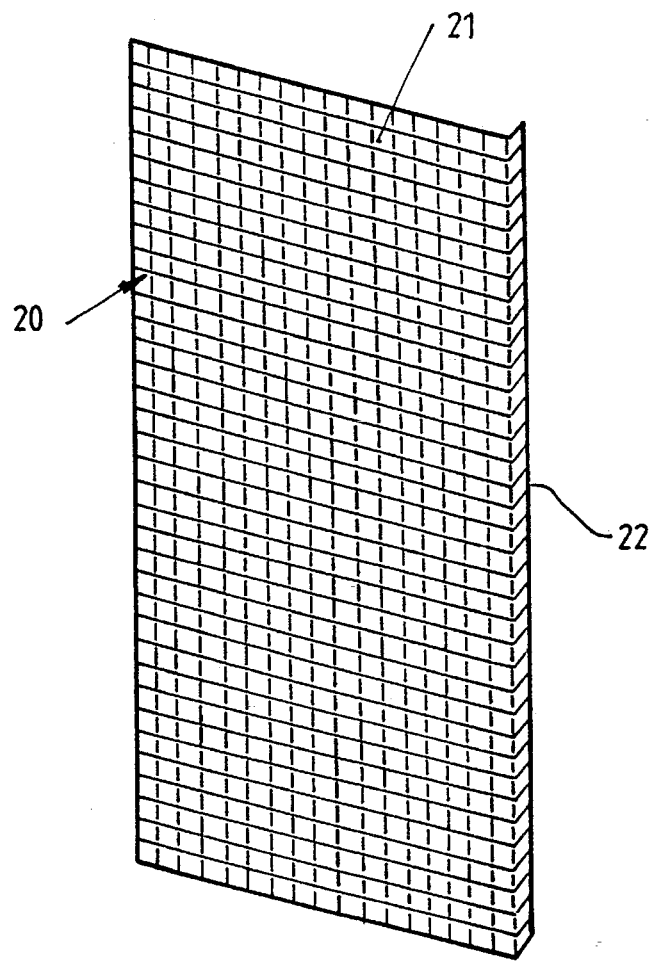
FIG. 2 is a plan view of a construction panel.

In FIG. 2, a panel 20 is constructed of rigid mesh having a major planar portion 21 and a minor turned-over portion 22. This turned-over portion is provided for the purposes of strength and ease of assembly.

Figure 3:
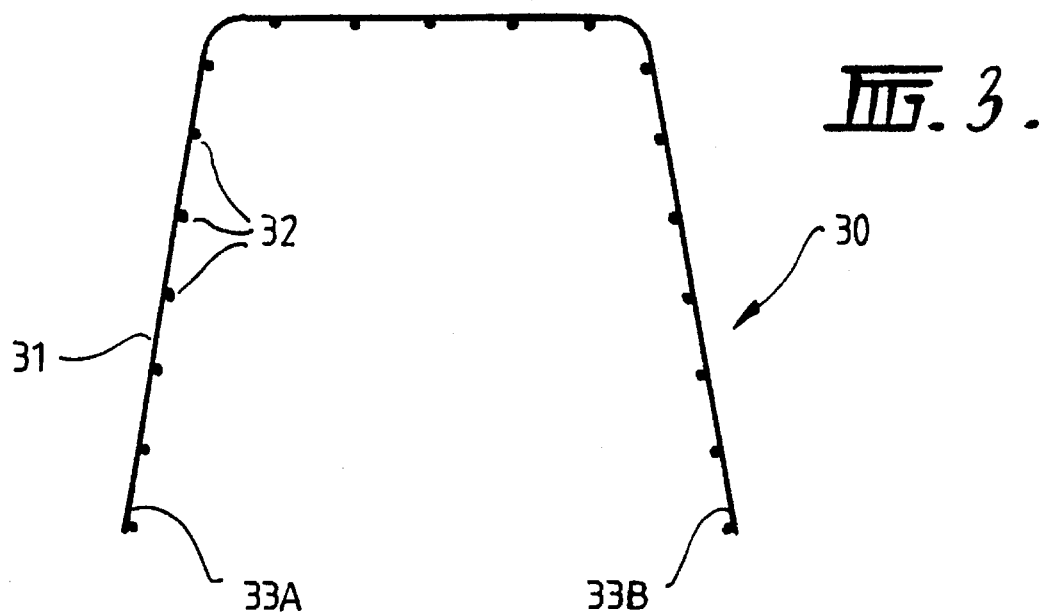
FIG. 3 illustrate one way of constructing a tunnel.

Referring to FIG. 3, a tunnel 30 comprises a series of connected mesh panels 31 with longitudinal rigid elongate mesh members one of which is indicated by numeral 32. Tunnel 30 may be inserted into the ground at regions indicated by numerals 33A and 33B.

Figure 4:
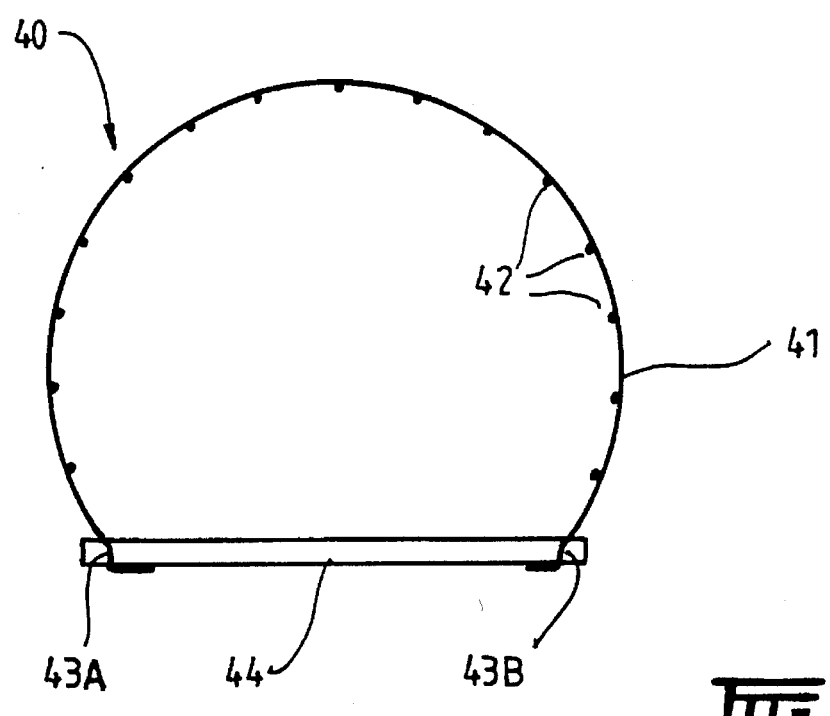
FIG. 4 illustrates a second way of constructing a tunnel.

In FIG. 4, a part spherical tunnel 40 is illustrated made up of curved panels 41 with longitudinal members of the rigid mesh one of which is indicated by numeral 42. The bottom regions 43A and 43B at each side of tunnel 40 are bent over so as to hook into a platform 44 forming the floor of tunnel 40. This platform is preferably made of wood.

Figure 5:
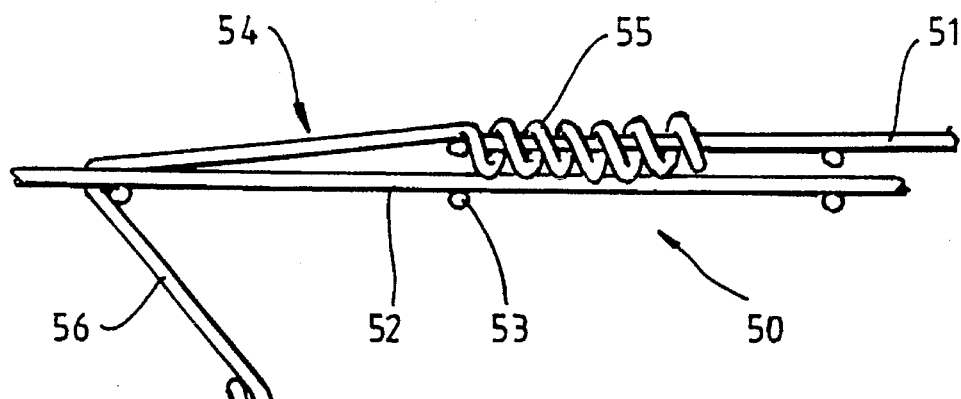
FIG. 5 illustrates a door catch or alternatively one embodiment of a joining means for adjacent panels.

With regard to FIG. 5, an overlap region 50 is illustrated between end regions 51 and 52 of two panels. Numeral 53 indicates a lateral elongate member of the mesh comprising each panel. Numeral 54 indicates a joining means comprising at a first end, a spiral gripping element 55 adapted to grip a longitudinal elongate member of the corresponding panel 51. At a second, end a hook means 56 is provided to hook around a lateral elongate member of the other panel member 52.

Figure 6:
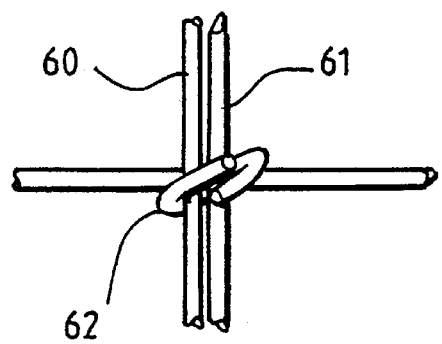
FIG. 6 illustrates another embodiment of a joining means for adjacent panels.

In FIG. 6, two panels 60 and 61 form a rectangular wire grid by placing their ends adjacent to one another so that a loop 62 of wire may be used to join one 60 panel to the other 61. A plurality of such loops 62 may be used to provide secure joining.

Figure 7:
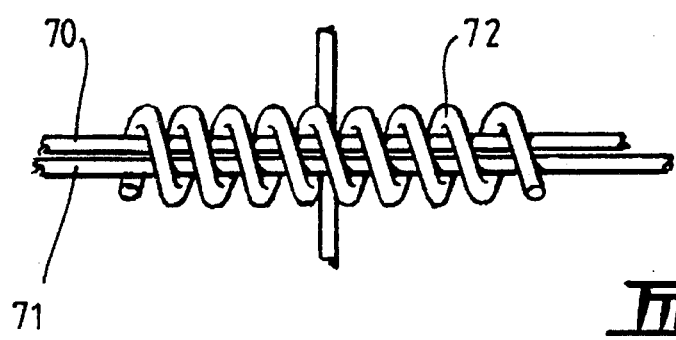
FIG. 7 illustrates a spring joining means for adjacent panels.

In FIG. 7, two adjacent panels 70 and 71 may be joined by spiral gripping element 72 wrapped around adjacent lateral struts elongate members of the mesh.

Figure 8A:
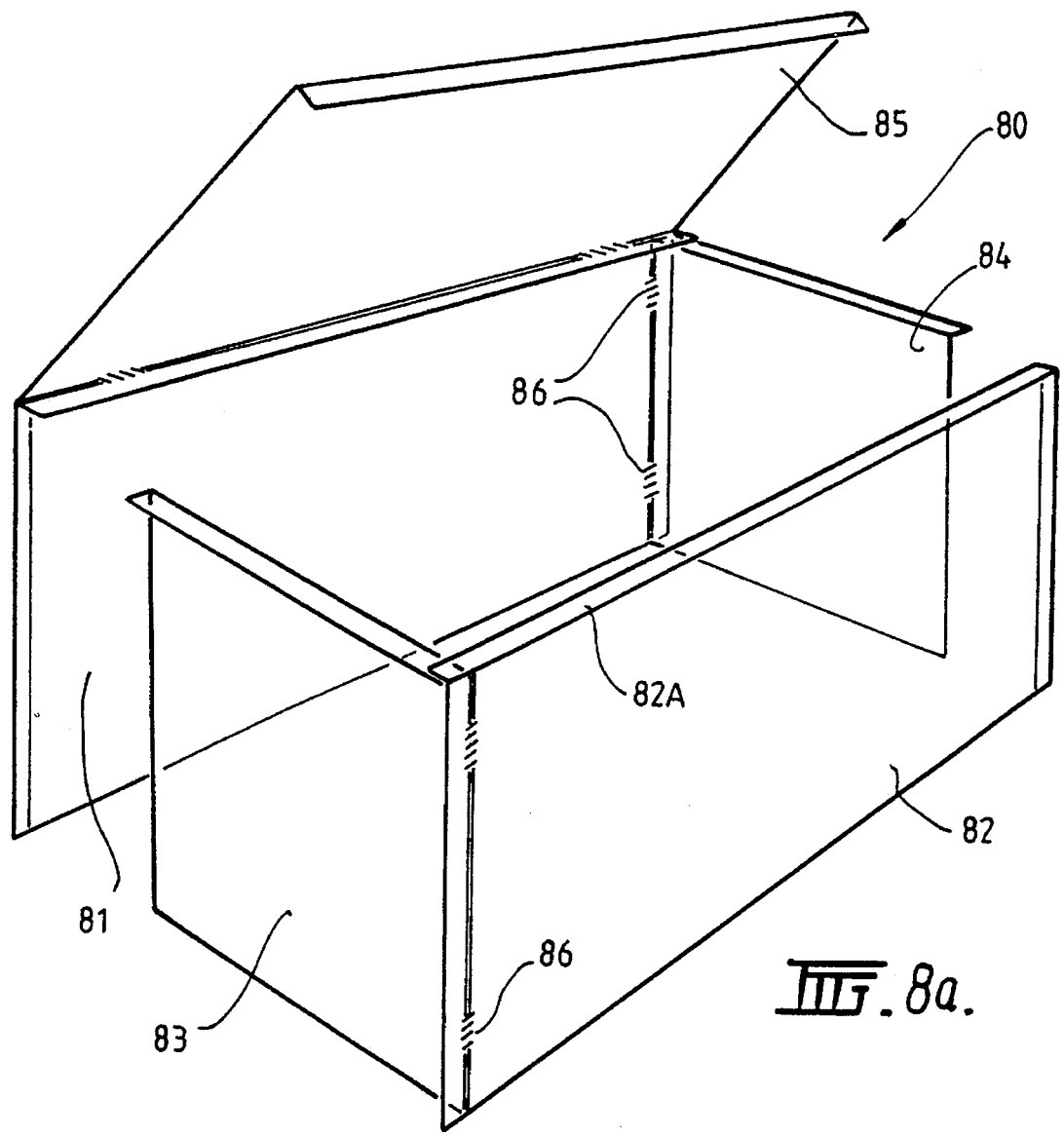
FIG. 8a illustrates a boxlike construction forming the basis of one module.

In FIG. 8a, a box-like enclosure 80 comprises opposing longitudinal panels 81 and 82 and end panels 83 and 84. A lid 85 is shown. The bottom is formed by the ground. Panel 82 is formed with a turned over portion 82A for strength; see FIG. 2. Numeral 86 indicates a spiral gripping element; see FIG. 7.

Figure 8B:
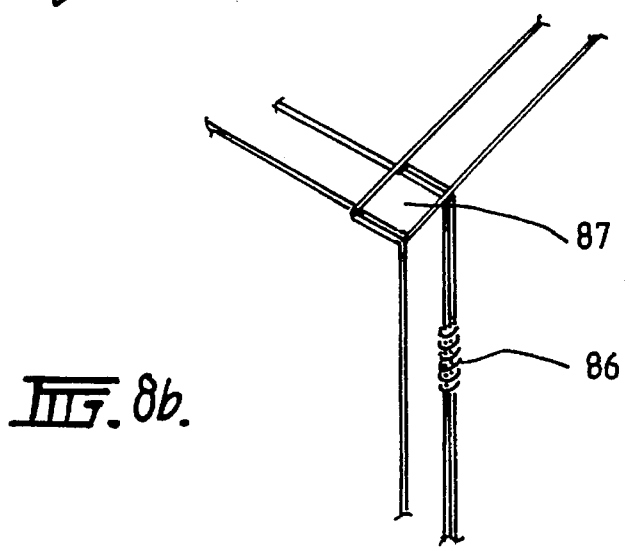

In FIG. 8b two turned over portions of adjoining panels overlap to form a region of overlap 87.

Turning to FIG. 9a, numeral 90 indicates an end view of a small module or tunnel formed from adjoining panels 91, 92, 93 and 94. FIGS. 9b and 9c show in succession partial collapse and folding together of panels 91, 92, 93 and 94.

With regard to FIG. 10a, a larger module or tunnel 100 is formed from adjoining panels 101, 102, 103, 104, 105, 106, 107 and 108; compare FIG. 9a. FIGS. 10b and 10c show in succession partial collapse and folding together of panels 101, 102, 103, 104, 105, 106, 107 and 108.

The claims defining the invention are as follows:

1. A modular cage system for a terrestrial animal or a bird which comprises at least two enclosure modules, each of the enclosure modules being selectively joined by joining means to at least one other of the enclosure modules by at least one of a tunnel module and a walkway module, and at least one of said enclosure modules having an entrance/exit means for providing entrance and exit by the animal or bird from and to sleeping quarters, wherein each of the enclosure modules is sufficiently large to allow the animal or bird to move in a relatively unobstructed fashion, each of the at least one of a tunnel and walkway is unobstructed to provide unobstructed passage from one enclosure to another and to provide the illusion of travel over an extended distance and a diminished sense of being caged, and the joining means facilitates joining of the modules together in any desired combination of modules in any desired configuration and facilitates unjoining of the modules for movement and reconfiguration of the modules as desired.

2. A modular cage system as claimed in claim 1, wherein each of the enclosure, tunnel and walkway modules comprises a plurality of structural elements adapted to be selectively secured together to form the case system.

3. A modular cage system as claimed in claim 2, wherein each of the elements of the system is demountable from each other element.

4. A modular cage system as claimed in claim 2, wherein each element of the system is collapsible for portability and storage.

5. A modular cage system as claimed in claim 2, wherein at least some of the elements are folded for the purpose of at least one of strength and ease of securing.

6. A modular cage system as claimed in claim 2, wherein at least some of the elements are foldable for ease of storage.

7. A modular cage system as claimed in claim 2, wherein the elements are joined one to another by joining means for joining the elements together and allowing a degree of relative movement between adjacent elements.

8. A modular cage system as claimed in claim 1, wherein at least one of said tunnel module and said walkway module is suspended at a selected height above the ground.

9. A collapsible modular cage system for a terrestrial animal or a bird comprising:

a collapsible first enclosure module and at least a collapsible second enclosure module, each of the enclosure modules being formed of a plurality of mesh panel members and being sufficiently large to allow the animal or bird to move in a relatively unobstructed fashion;

at least a first collapsible passage module, comprising at least one of a collapsible tunnel module and a collapsible suspendable walkway module, each of the passage modules being formed of a plurality of mesh panel members and being unobstructed to provide unobstructed passage from one enclosure to another, to provide the illusion of travel over an extended distance and a diminished sense of being caged;

pivotal joining means, for, in each of the enclosure and passage modules, selectively pivotally joining each of the panel members to at least one adjacent panel member, to facilitate erection of the modules and foldable collapsing of the modules for one of storage and transportation; and releasable joining means, for selectively and releasably joining each of the enclosure modules with at least one of the passage modules, for communication with at least one other of the enclosure modules, and for facilitating joining of the modules together in any desired combination of modules in any desired configuration and unjoining of the modules for movement and reconfiguration of the modules as desired.

10. A modular cage system as claimed in claim 9, wherein at least one of the enclosure modules has an access means for providing entrance and exit by the animal or bird from and to sleeping quarters.

11. A modular cage system as claimed in claim 10, wherein the access means comprises one of an opening and a doorway at an end of a said passage means leading to the sleeping quarters.

12. A modular cage system as claimed in claim 9, wherein the pivotal joining means comprises a plurality of wire loops secured around elongate mesh members of adjoining mesh panels.

13. A modular cage system as claimed in claim 9, wherein the pivotal joining means comprises a plurality of spiral members secured around elongate mesh members of adjoining mesh panels.

14. A modular cage system as claimed in claim 9, wherein the releasable joining means comprises a plurality of releasable hook members, one end of each of the hook members has a spiral gripping member for being secured around an elongate mesh member of a first of the panels, an opposite end of each of the hook members has a hook portion for releasably hooking an elongate mesh member of a second adjacent panel which runs substantially normal to the elongate mesh member of the first panel secured by the gripping member.

15. A modular cage system for a terrestrial animal or a bird comprising:

a plurality of rigid mesh panel members;

a plurality of joining means for selectively joining an edge of a said panel member to an adjacent said mesh member, for:

i) building a plurality of enclosure modules, of any desired length, height and width, by joining an appropriate plurality of said panel members together;

ii) building a plurality of one of a tunnel module and a suspended walkway module, of any desired length, height and width, by joining an appropriate plurality of said panel members together, for providing an unobstructed pathway for said animal or bird from each said enclosure module to at least one of another said enclosure module and to a sleeping quarters via an entrance/exit means; and iii) for selectively releasably joining each of said plurality of enclosure modules to at least one other of the enclosure modules with one of said plurality of one of a tunnel module and walkway module in any desired configuration, and for unjoining said modules from each other, as desired, for movement, reconfiguration and storage; and iv) in each said module, pivotally securing each said panel member to at least one adjacent said panel member, for collapsibly folding each said module for one of storage and transportation.

* * * * *